United States Patent [19]
Gülich

[11] 3,907,002
[45] Sept. 23, 1975

[54] CONNECTION BETWEEN AN INJECTION INTERNAL COMBUSTION ENGINE AND A FUEL TANK

[75] Inventor: Hans-Adolf Gülich, Bensberg, Germany

[73] Assignee: Daimler-Benz Aktiengesellschaft, Germany

[22] Filed: Apr. 10, 1973

[21] Appl. No.: 349,695

[30] Foreign Application Priority Data
Apr. 11, 1972 Germany............................ 2217252

[52] U.S. Cl................................. 138/115; 138/116
[51] Int. Cl.² ........................................... F16L 9/18
[58] Field of Search ........... 138/115, 116, 117, 111, 138/118, 178

[56] References Cited
UNITED STATES PATENTS

| 29,276 | 7/1860 | Holmes | 138/111 |
| 2,236,171 | 3/1941 | Garretson | 138/111 |
| 2,916,055 | 12/1959 | Brumbach | 138/111 |
| 3,004,330 | 10/1961 | Wilkins | 138/115 |

FOREIGN PATENTS OR APPLICATIONS

| 1,123,331 | 8/1968 | United Kingdom | 138/111 |
| 773,584 | 11/1934 | France | 138/111 |
| 1,878 | 12/1892 | United Kingdom | 138/115 |

OTHER PUBLICATIONS

Heating, Piping & Air Conditioning, October 1960, p. 34, Samuel Moure & Co., Dekoron Products Division.

Primary Examiner—James J. Gill
Assistant Examiner—Anthony V. Ciarlante
Attorney, Agent, or Firm—Craig & Antonelli

[57] ABSTRACT

A connection between an injection internal combustion engine and a fuel tank which includes a hose member that contains several lines; the hose is preferably made of synthetic plastic material.

9 Claims, 3 Drawing Figures

CONNECTION BETWEEN AN INJECTION INTERNAL COMBUSTION ENGINE AND A FUEL TANK

The present invention relates to a connection between an internal combustion engine and a fuel tank, and more particularly to a connection between an injection-type internal combustion engine and a fuel tank in a truck located at a relatively large distance from the engine.

Injection internal combustion engines are connected with the fuel tank by the feed line and by one or several return lines. This requires especially in commercial types of motor vehicles such as trucks, in which a larger distance has to be bridged between the internal combustion engine and the tank, a complicated and costly installation and location of the individual lines. In contradistinction thereto, the present invention, according to which a hose member contains several lines, makes possible a simple and rapid establishment of the connection between the injection internal combustion engine and the fuel tank. The hose member according to the present invention can be equally readily disassembled or exchanged. The need to study and follow the course of the individual lines is dispensed with by the present invention.

According to a further feature of the present invention, the hose member may contain a feed line and one or two return lines. In addition to the fuel line, the hose member may include additionally a vent line for the fuel tank. As a result thereof, one is not limited to undertake the venting by means of a short vent pipe at the fuel tank which for the most part is exposed in trucks to the dust and dirt of the road, but instead the air can be removed at a place protected against contaminations, for example, underneath the engine hood.

According to a further feature of the present invention, the individual lines of the hose member are arranged adjacent one another in a row. They may be connected with each other by webs. By reason of the fact that the individual lines differ from one another according to the present invention by their form and/or size as well as possibly by differently large spacings, confusions and mix-ups of the lines are avoided and the correct connection of the individual lines to the internal combustion engine and the fuel tank is facilitated thereby.

According to the present invention, apertures and/or projections are provided for the mounting of the hose member, which permit a simple attachment of the hose member, for example, at the frame of a truck. The connection between the internal combustion engine and the fuel tank can again be disengaged in a correspondingly simple and easy manner. The apertures and/or projections may be arranged in an advantageous manner at webs which have a larger cross dimension than the remaining webs. According to a still further feature of the present invention, a synthetic plastic material of any known suitable type, such as synthetic resinous material may be used as material for the hose member which offers the possibility to establish a flexible and resistant connection between the injection internal combustion engine and the fuel tank in a simple and inexpensive manner.

Accordingly, it is an object of the present invention to provide a connection between an injection internal combustion engine and a fuel tank which avoids by simple means the aforementioned shortcomings and drawbacks encountered in the prior art.

Another object of the present invention resides in a connection between an injection-type internal combustion engine and a fuel tank which is relatively simple and inexpensive and which permits a simple and rapid installation, removal and/or exchange of the connection.

A further object of the present invention resides in a connection between an injection-type internal combustion engine and a fuel tank which allows the combination in a single hose structure of several lines, including a vent line so that its location can be selected with a view toward minimizing contaminations.

Another object of the present invention resides in a multi-line connection between an injection internal combustion engine and the fuel tank of the vehicle which greatly facilitates the correct connection of the individual lines with the internal combustion engine and the fuel tank and at the same time permits a rapid and easy installation and removal of the multi-line connection.

These and further objects, features and advantages of the present invention will become more apparent from the following description when taken in connection with the accompanying drawing which shows, for purposes of illustration only, two embodiments in accordance with the present invention, and wherein.

Figure 1:
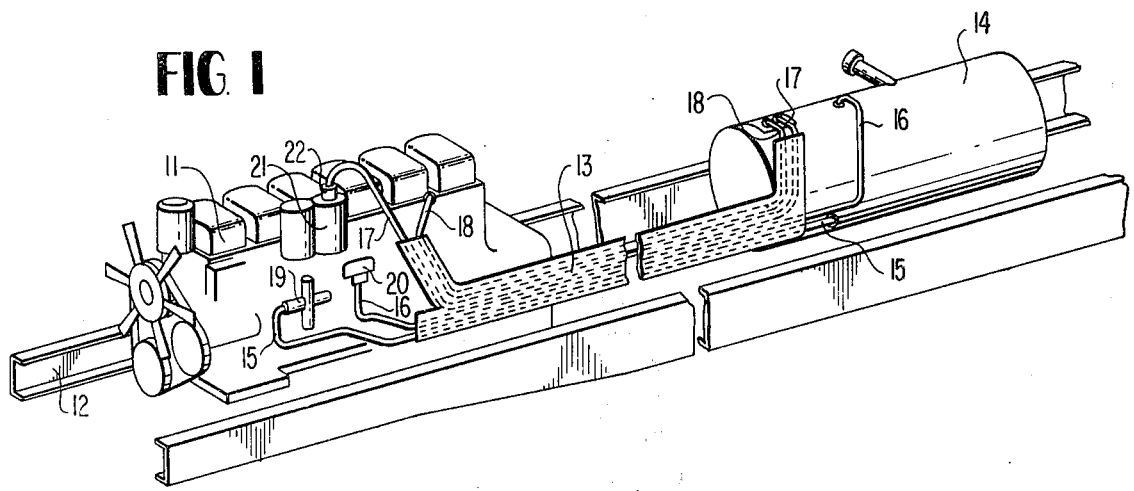
FIG. 1 is a somewhat schematic perspective view illustrating the connection between an injection internal combustion engine and the fuel tank of a truck in accordance with the present invention.

Referring now to the drawing wherein like reference numerals are used throughout the various views to designate like parts, an air-compressing injection piston internal combustion engine, to be referred to hereinafter as internal combustion engine 11 is secured, as shown in FIG. 1, at the frame 12 of a commercial type of motor vehicle such as a truck. A hose member generally designated by reference numeral 13 which is secured at the vehicle body (now shown) connects the internal combustion engine 11 with a fuel tank 14 arranged at a relatively large distance from the engine.

Figure 2:
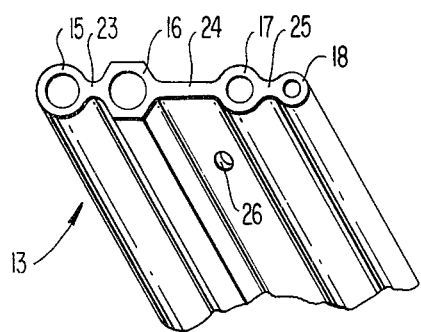
FIG. 2 is a partial perspective view of a hose member with four connecting lines in accordance with the present invention.

The hose member 13 contains, as illustrated in FIG. 2, four lines arranged adjacent one another, and more particularly a feed line 15 for the fuel, a vent line 16 as well as an overflow line 17 and a leakage oil line 18 for the fuel. At both ends, the hose member 13 is split into line pairs 15/16 and 17/18 and finally into individual lines 15, 16, 17 and 18 which lead to their respective connecting places. The feed line 15 leads from the bottom side of the fuel tank 14 to a fuel feed pump 19. The vent line 16 connects the top side of the tank 14 with a vent connecting stub 20 which is secured at the internal combustion engine 11 at a place protected against contaminations and soiling. It is also possible to permit the vent line to terminate openly in the engine space, possibly without separate vent connecting stub. The overflow line 17 leads from an overflow valve 22 provided at the fuel filter 21 back to the top side of the fuel tank 14. The leakage oil line 18 which is connected with the injection nozzles (not shown) of the internal combustion engine 11, also leads back to the top side of the fuel tank 14. The use of two separate return lines may be appropriate since the fuel conducted back in the overflow line 17 has a higher pressure compared to the fuel conducted back to the fuel tank 14 in the leakage oil line 18.

As can be seen from FIG. 2, the individual lines 15 to 18 of the hose member 13 are arranged adjacent one another in one row and are connected with each other by webs 23, 24 and 25. For purposes of fastening the hose member 13 at the vehicle the web 24 is provided with through-apertures 26 for bolts and for that reason has a larger transverse dimension than the webs 23 and 25. The cross-sectional area of the vent line 16 is delimited by a regular hexagon for better recognition. The feed line 15, the overflow line 17 and the leakage oil line 18 have differently large outer diameters. The individual lines 15 to 18 of the hose member 13 can be readily distinguished from one another by these differences of the shape, of the size thereof, and by the asymmetric arrangement thereof as a result of differingly large spacings. The connection of the individual line ends of the hose member 13, which, for this purpose, can be split up along the webs 23, 24 or 25, depending on need, is facilitated thereby and mix-ups are avoided.

Figure 3:
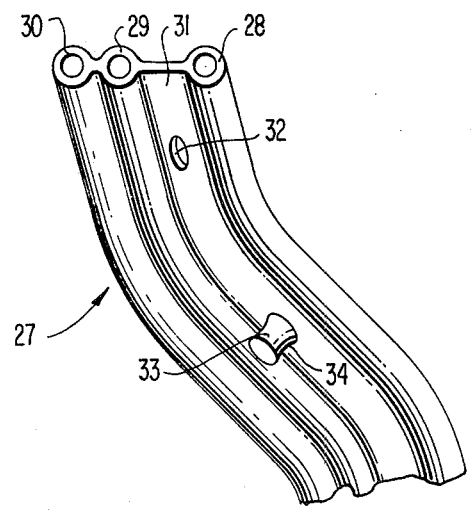
FIG. 3 is a partial perspective view of a modified embodiment of a hose member with three connecting lines in accordance with the present invention.

Another type of construction of a hose member generally designated by reference numeral 27 for a truck is illustrated in FIG. 3, in which the overflow line and the leakage oil line are combined into a common return line 28. Reference numeral 29 designates in this figure the feed line for the fuel and reference numeral 30 the return line. A web 31 between the feed line 29 and the return line 28 has a larger dimension in the transverse direction and is provided with apertures 32 and projection 33 which serve for the fastening of the hose member 27. The through-apertures 32 which have the shape of an elongated opening are placed for that purpose over generally axially symmetrical projections provided with constrictions and disposed at the vehicle frame, at the engine or at the body of the vehicle, and are retained thereat by a form-locking connection. The projections 33 at the web 31 of the hose member 27 which are also each provided with a constriction 34, are forced into corresponding wall apertures at the vehicle under slight elastic deformation and continue to remain stuck within the same, thereby causing the secure attachment of the line. However, it is also possible to provide the hose member only with through-apertures or only with projections. The connection according to the present invention between an injection internal combustion engine and the fuel tank is suited also for stationary installations.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A hose member comprising a plurality of elongated channels provided in a unitary structure of a single flexible material, said single flexible material forming walls of said channels and forming interconnecting webs between said channels, thereby forming said unitary structure, said plurality of elongated channels being arranged adjacent to one another in a parallel row of said unitary structure, means for distinguishing individual ones of said plurality of channels, said means for distinguishing individual ones of said elongated channels being at least one of different cross-sectional channels of said individual ones and different separation distances of said interconnecting webs between adjacent ones of said plurality of elongated channels, and at least one of aperture means and projection means formed in said interconnecting webs for mounting said hose member.

2. A hose member according to claim 1, wherein said means for distinguishing is said plurality of channels having different cross-sectional shapes.

3. A hose member according to claim 2, wherein said means for distinguishing is also said interconnecting webs having different separation distances between adjacent ones of said plurality of channels.

4. A hose member according to claim 1, wherein said means for distinguishing is said interconnecting webs having different separation distances between adjacent ones of said plurality of channels.

5. A hose member according to claim 4, wherein both aperature means and projection means are provided for mounting said hose member.

6. A hose member according to claim 4, wherein said aperature means are provided at interconnecting webs having larger separation distances between adjacent channels.

7. A hose member according to claim 1, wherein at least a portion of said plurality of elongated channels are separable from the remaining portion of said plurality of channels.

8. A hose member according to claim 1, wherein said single flexible material is a synthetic resinous material.

9. A hose member comprising a plurality of elongated channels provided in a unitary structure of a single flexible material, said single flexible material forming walls of said channels and forming interconnecting webs between said channels, thereby forming said unitary structure, said plurality of elongated channels being arranged adjacent to one another in a parallel row of said unitary structure; mounting means for mounting said unitary structure, said mounting means being at least one aperture provided in at least one interconnecting web, said at least one interconnecting web having a larger separation distance between adjacent elongated channels than other interconnecting webs; and means for distinguishing individual ones of said plurality of elongated channels, the distinguishing means being one elongated channel having a hexagonal cross-sectional shape and the remaining elongated channels having circular cross-sectional shapes of different diameters, said distinguishing means further being said interconnecting webs having different separation distances between adjacent elongated channels.

* * * * *